(12) United States Patent
Tatum et al.

(10) Patent No.: US 6,787,756 B2
(45) Date of Patent: Sep. 7, 2004

(54) SEMICONDUCTOR LASER-BASED AREA SCANNER

(75) Inventors: Jimmy A. Tatum, Plano, TX (US); James K. Guenter, Garland, TX (US)

(73) Assignee: Honeywell International Inc., Morristown, NJ (US)

( * ) Notice: Subject to any disclaimer, the term of this patent is extended or adjusted under 35 U.S.C. 154(b) by 192 days.

(21) Appl. No.: 09/834,244

(22) Filed: Apr. 12, 2001

(65) Prior Publication Data

US 2002/0148944 A1 Oct. 17, 2002

(51) Int. Cl.[7] ................................................ H01J 40/14
(52) U.S. Cl. .................................... 250/221; 250/559.4

(56) References Cited

U.S. PATENT DOCUMENTS 4,179,685 A * 12/1979 O'Maley ..................... 382/135
4,509,075 A * 4/1985 Simms et al. ............... 348/129
6,313,460 B1 * 11/2001 Haas et al. ............. 250/231.13

\* cited by examiner

Primary Examiner—Que T. Le
(74) Attorney, Agent, or Firm—Andrew A. Abeyta; Ortiz & Lopez, PLLC

(57) ABSTRACT

Multiple laser optical sensing systems and methods for detecting target characteristics are disclosed. The present invention detects the presence of an object in a monitored area using an laser-based object detection system and may selectively cause a controlled response when an object is detected. At least two laser signals may be emitted into a monitored area using a vertical cavity surface emitting laser structure. At least one detector receives any laser signals not blocked by an object. The system determines the presence or absence of an object in the environment using a microprocessor and determines the objects characteristics by comparing received laser signals associated with it to object characteristics stored in a memory. The system may selectively causing a controlled response in accordance with the determination of object characteristics and/or correlating response criteria.

18 Claims, 11 Drawing Sheets

SEMICONDUCTOR LASER-BASED AREA SCANNER

TECHNICAL FIELD

The present invention relates generally to the field of sensing. More specifically, the present invention relates generally to multiple laser optical sensing systems and methods. The present invention further relates to system and methods for scanning areas (e.g., rooms, selected environments). The present invention further relates to enable/disable activities bases on environment scanning feedback.

BACKGROUND OF THE INVENTION

Previous approaches to addressing sensing needs have generally involved using a single light signal from a light source, such as a light emitting diode, and multiple detectors. In order to illuminate a large area in an environment using a single light source, two general methods are known. One approach typically involves emitting a broad light signal from the light source and detecting the signal with one of multiple detectors positioned throughout the environment. The other approach typically involves emitting a narrow light signal from the light source, spreading the signal around the environment by reflecting it off of a rotating mirror, for instance, and detecting the signal with one of multiple detectors positioned throughout the environment. While feasible, both approaches typically require multiple detectors and are usually not power efficient as a result, yielding a low signal-to-noise ratio. A poor power-transfer ratio reflects this inefficiency as the individual detector that receives a light signal usually detects only a portion of the signal that was originally emitted. Consequently, the signal that was detected generally provides only limited information about a target being sensed in the environment. These approaches also tend to limit the size range of the target being sensed in an environment due to the nature of the single light signal.

The limitations of these previous approaches are often manifested in applications such as detecting the motion of a target in an environment. Many motion detection systems generally involve a line-of-sight operation, where at least one detector detects the motion of a target as the target breaks a beam of light emitted from a light source. In relatively simple applications, such as determining the presence or absence of a target, this approach generally suffices. For more complex applications, such as determining the direction of the target's motion, this approach proves less adequate. When a target moves across a single light signal emitted by a light source, the signal received by a detector gradually decreases as the signal blocked by the target gradually increases. This gradual change in signal detection typically requires a complex algorithm to determine the position of the target in the environment. Adding multiple detectors may provide more information and decrease the complexity of the algorithm required, though introduces power inefficiencies as mentioned previously, as well as added cost associated with additional hardware.

The limitations of the aforementioned approaches also relate to applications involving target recognition. Many known systems, either for recognizing only specific targets or for mapping spatial characteristics of targets, involve spreading a light signal with a rotating mirror and/or using multiple detectors. Holograms may also be used to spread the light signal by dividing the signal into smaller light signals. An approach for detecting only specific targets involves emitting pulses of signals from a transceiver, receiving the signals that reflect off of a target, and comparing the received signals with preset signals reflected off of known targets. Information about the known objects is typically stored in a database. An approach for mapping a target involves superimposing light signals received by different detectors in the presence of a target and comparing the signals with respect to signals associated with the area or environment without the target.

While each of these approaches is feasible for a particular function, none is known to perform several functions. This deficit creates a need for a versatile system that is both power efficient and cost effective. Such a system could be capable of, for instance, detecting the presence or absence of any target or of a specific target, detecting the spatial characteristics of a target, detecting the motion of any target or a specific target, or detecting various characteristics about the motion of a target.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

An 'area scanner' could be used in a number of device control applications. Devices may include area or room alarms, room lighting, appliance control, automatic doors, etc.) In a possible security application, the sensing system could be used to detect the presence or absence of a person, which could in turn sound an alarm. Other information about the person could also potentially be determined, such as the size and shape of the person (thereby eliminating certain targets, such as pets, from an response, such as turning on a light), the location within the room, and the direction and speed of movement in the room. All of such information could be determined by placing a single detector in the room, positioned near to or far from VCSEL structure, though a plurality of detectors could be used as well. A lens or array of lenses could also be placed near detector to effectively expand the area from which it can receive light signals. As the detector(s) receive(s) light signals reflected off of the target and/or the walls or other objects in the room, the microprocessor processes the signals to provide a desired result (e.g., turn on lights, HVAC).

An aspect of the present invention includes a multiple laser optical sensing system for detecting target characteristics using a vertical cavity surface emitting laser. The system may include a vertical cavity surface emitting laser structure with at least two emission apertures that could be defined by photolithography. A laser signal may be emitted into an environment from each of the emission apertures. The system may also include at least one detector that is operationally responsive to the vertical cavity surface emitting laser structure. Finally, the system may include a microprocessor that is operationally coupled to the detector(s). In operation, the vertical cavity surface emitting laser structure may emit at least two laser signals into the environment, which may be occupied by a target. At least one detector detects the laser signals once they have passed through the environment. The microprocessor may then determine target characteristics based on laser signals received by the detector(s). Within the same vertical cavity surface emitting laser structure, the laser signals emitted may be identical or not identical. Optics may also be added to the system, such that laser signals pass through at least one lens or reflect off of a mirror or mirrors after exiting the emission apertures.

An aspect of the present invention provides methods for detecting target characteristics transmissively or reflectively using a vertical cavity surface-emitting laser. In a transmissive method, a vertical cavity surface emitting laser structure may statically emit at least two laser signals into an environment, which may be occupied by a target. The target may block at least one of the laser signals passing through the environment, and at least one detector may transmissively receive any of the signals not blocked by the target. A microprocessor may then determine target characteristics by comparing characteristics of the laser signals emitted by the vertical cavity surface emitting laser structure with characteristics of the signals received by the detector(s).

In a reflective method, a vertical cavity surface emitting laser structure may serially emit at least one laser signal at a time into an environment, which may be occupied by a target. At least one of the laser signals may reflect off of the target and may be detected by at least one detector. A microprocessor may then determine target characteristics by comparing temporal characteristics of the laser signals emitted by the vertical cavity surface emitting laser structure with temporal characteristics of the signals received by the detector(s).

In any method taught by the present invention, a microprocessor could determine the size or shape of a target by determining which laser signals are received by a detector after different arrays of laser signals are emitted by a vertical cavity surface emitting laser structure. The microprocessor could also detect motion of the target in an environment by detecting changes in the array of laser signals that are blocked or reflected off of the target.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
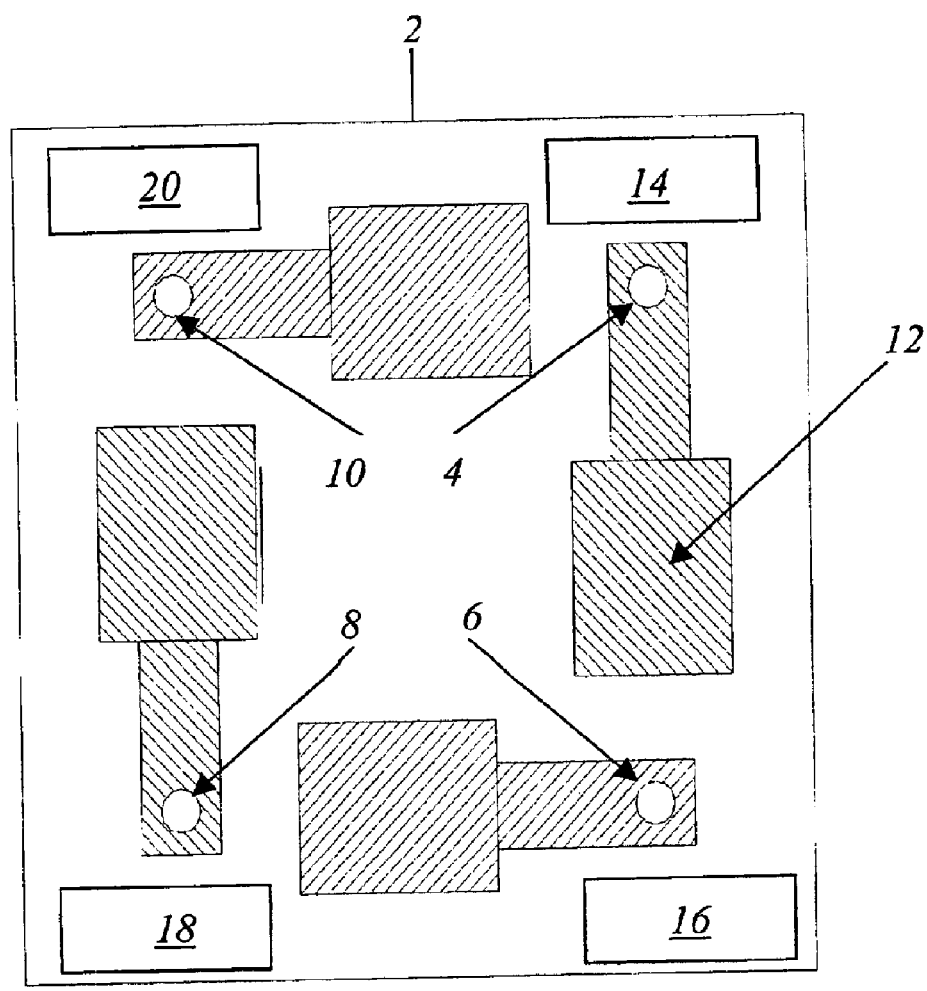
FIG. 1 illustrates a diagram of a vertical cavity surface emitting laser structure.

In the following nonlimiting example of this embodiment, FIG. 1 shows a vertical cavity surface emitting laser (VCSEL) structure 2 with a plurality of emission apertures 4, 6, 8, and 10. Emission apertures 4 can be fabricated by using either proton isolation or dielectric oxide techniques to provide both carrier and optical confinement. Emission aperture 4, for instance, is functionally integrated (although they do not have to be integrated) with a bond pad 12 and is electrically coupled to an element 14. Elements 16, 18, and 20 are also shown and can be identical or not identical to each other and to element 14. Upon powering elements, emission apertures emit light signals (not shown) perpendicular to VCSEL structure 2, making them especially amenable to the fabrication of both one and two-dimensional arrays. While the example shown in FIG. 1 (and other figures) comprises a 2×2 array of emission apertures, it should be noted that the fabrication of M×N arrays is also feasible and that the 2×2 array is only provided to simplify explanation.

One of the principle advantages to array fabrication using VCSEL structures 2 is that all of the dimensions in the array can be fabricated using photolithography, thereby incorporating high dimensional tolerances in the placement of the emission apertures. As a result, the high dimensional tolerance produces a precisely defined array of light signals emitted and enables the fabrication of any one or two-dimensional array desired, such as the pattern of a cross. The elements can be electrically connected or coupled in virtually any manner desired as well, permitting light signals to be emitted individually or in groups. Light signals can be emitted in single or multiple spatial modes and can vary in terms of divergence angles and/or the diameter of the light signal being emitted and focused. Light signals can also be emitted in single or multiple wavelengths. By using advanced selective epitaxial techniques, light signals of widely separated wavelengths can be fabricated.

Figure 2:
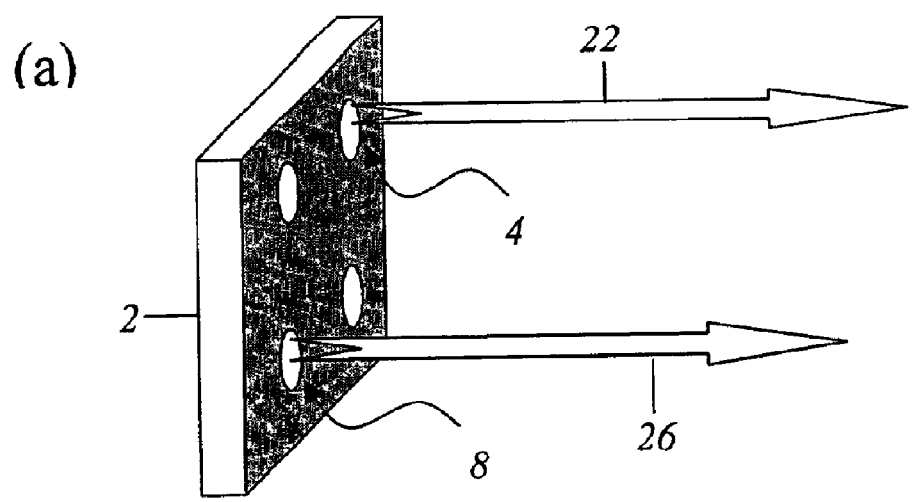
FIG. 2 illustrates diagrams of a vertical cavity surface emitting laser structure emitting two different patterns of light signals 2(a) and 2(b)
Figure 2:
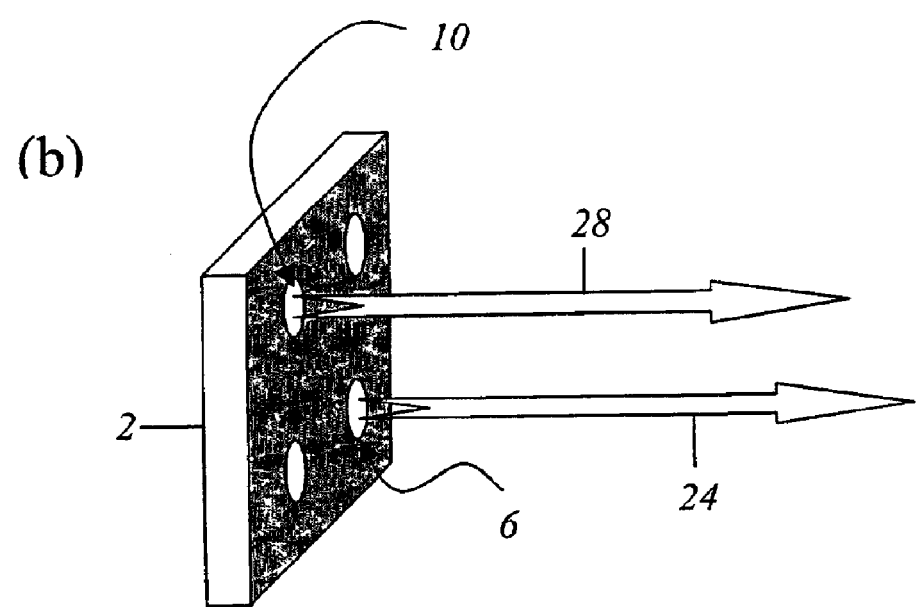

FIG. 2 illustrates the illumination of different patterns of light signals by the same VCSEL structure 2. In FIG. 2(a), emission aperture 4 emits light signal 22 while aperture 8 emits light signal 26. In FIG. 2(b), emission aperture 6 emits light signal 24 while aperture 10 emits light signal 28. Similarly, any other one, or group of two, three, or four, light signals could be emitted from a 2×2 array. It should be reiterated that any array including any number of emission apertures could be constructed, permitting the emission of a variety of light signal patterns.

Figure 3:
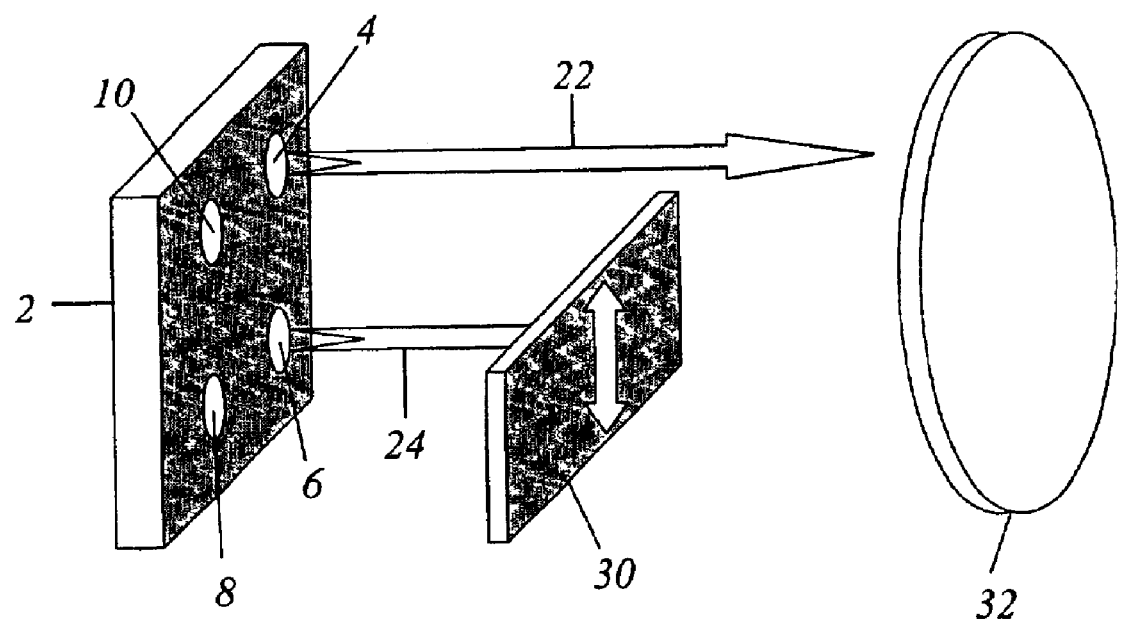
FIG. 3 illustrates a diagram of a target blocking a light signal statically emitted from a vertical cavity surface emitting laser structure before it reaches a detector.

The first preferred embodiment is a reconfigurable static structured light source, which is depicted in FIG. 3. The diagram shows VCSEL structure 2 simultaneously emitting light signals 22 and 24 into an environment from emission apertures 4 and 6, respectively. While different light signals (or sets of signals) of the array can be emitted at different times, the timing of the changes is not directly relevant to the intended function. A target 30 is positioned in the environment between VCSEL structure 2 and a detector 32, which could be any of various types, such as a photodiode. A photodiode detector could either include an individual photodiode, multiple photodiodes individually packaged, or an array of photodiodes on a single structure in a single package.

As target 30 moves upward, the particular light signal received by detector 32 changes from full on (no obstruction), to half on (signal 24 blocked but not signal 22), and finally to full off (both signals 24 and 22 blocked). This happens in an essentially digital, or stepwise, fashion. A single illuminator in a similar geometry would provide only a very gradual change in detector illumination, requiring a more sophisticated algorithm to determine position at the midpoint. However, with this same VCSEL array, the identical function can be provided for target 30 moving orthogonally to that shown in FIG. 3, simply by emitting signals from apertures 6 and 8 instead of 4 and 6, for example. For detection of a diagonally-moving target, signals from apertures 4 and 8 or 6 and 10 would be emitted. Thus, multiple motions could be sensed with a single detector 32 by sequentially emitting light signals from different apertures.

An extension of the concept requires larger element counts. Consider a VCSEL array with 5×2 elements, for example. If a stationary target with a corrugated edge is interposed between the VCSEL array and a detector, the corrugations will block some light signals and not others. By cycling through several fixed patterns of "lit" and "unlit" VCSELs, the detector signal can be interpreted as a map of the corrugated edge. In this way the corrugated obstruction acts as a key and the optical assembly including the VCSEL array and the detector acts as a lock. Electronics known to those skilled in the art can produce locks that recognize only one or several keys. Any emission patterns that correspond in a certain way to the pattern on the target would result in a positive identification, or recognition, by the detector.

Figure 4:
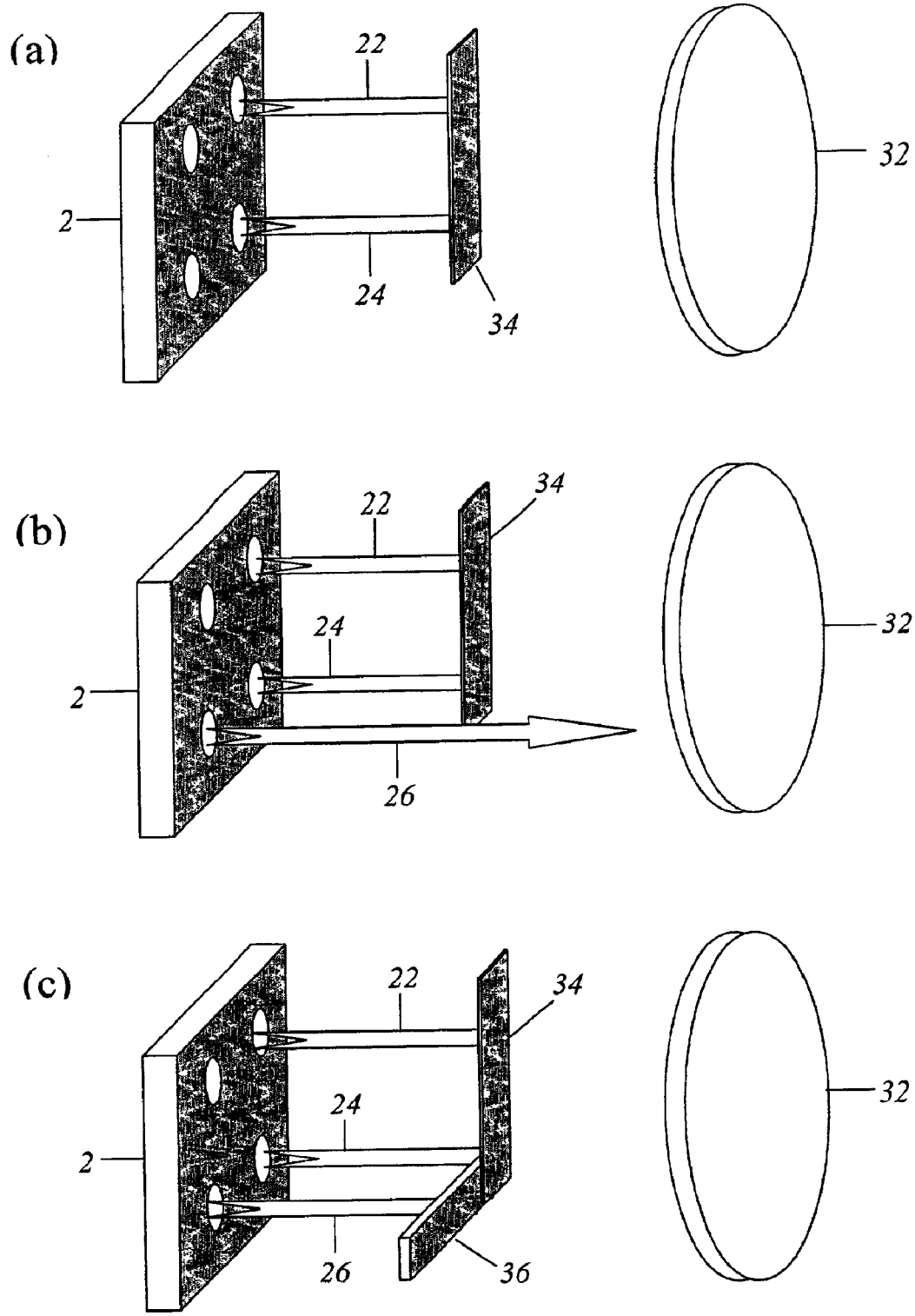
FIG. 4 illustrates diagrams of a vertical cavity surface emitting laser structure cycling through different emission patterns of light signals to determine a map of the target. In 4(a) light signals forming a vertical line are blocked by a vertical bar-shaped target and none reach a detector. When a different pattern of signals is emitted as in 4(b), forming a right angle, one signal reaches the detector. In the presence of a right angle-shaped target as in 4(c), however, the same right angle-shaped pattern as emitted in 4(b) would be blocked.

FIG. 4 illustrates VCSEL structure 2 cycling through different emission patterns of light signals to determine a map of a target. In FIG. 4(a), a vertical bar-shaped target 34 blocks light signals 22 and 24 from reaching detector 32. When a different pattern of signals is emitted (22, 24, and 26) as in (b), signal 26 reaches detector 32 while signals 22 and 24 remain blocked. Detector 32, therefore, recognizes that target 34 has no horizontal piece spatially correlated to light signal 26. In the presence of a right angle-shaped target 36 as in FIG. 4(c), however, the same right angle-shaped pattern as emitted in FIG. 4(b) is blocked. Neither signal 22, 24, nor 26 reaches detector 32, indicating to detector 32 that target 36 (unlike target 34) does have a horizontal piece spatially correlated to light signal 26.

Figure 5:
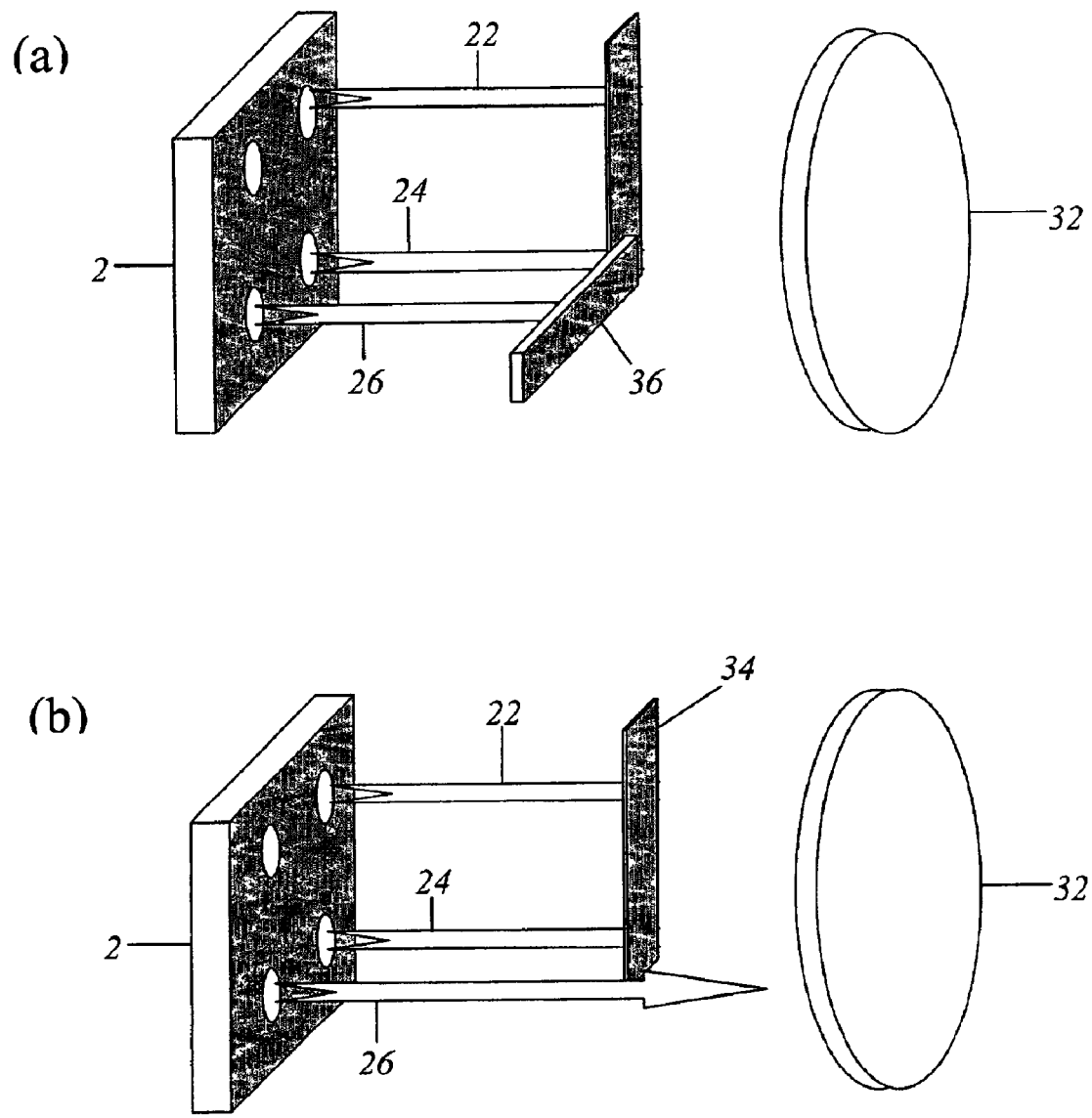
FIG. 5 illustrates diagrams of a vertical cavity surface emitting laser structure emitting the same pattern of light signals in 5(a) and 5(b). In 5(a) a target blocks all emitted signals, whereas in 5(b) a different target does not block all signals, allowing recognition of a specified target only.

FIG. 5 illustrates how a specified target can be recognized while others are not. In this example, VCSEL structure 2 emits the same pattern of light signals in FIGS. 5(a) and (b), though the shape of the target differs. In FIG. 5(a), target 36 blocks all emitted signals 22, 24, and 26 from reaching detector 32. In FIG. 5(b), target 34 blocks only light signals 22 and 24, permitting signal 26 to reach detector 32. With the same pattern of light signals emitted, therefore, different signals will reach detector 32 depending on the shape of the particular target present in the environment. This difference subsequently could allow for recognition of a specified target when an exact "match" is made by the system.

The aforementioned corrugated opaque obstruction is only one example of possible key configurations. Among other possiblities are arrays of holes or exposed areas on film.

In addition to using a plurality of light sources, the present invention could perform object recognition tasks faster than many current systems by using a camera as a detector. The camera could be one of various types, including a charge-coupled device (CCD) or CMOS camera. When the camera display of a typical current system is divided into separate areas, complex image processing algorithms are often required to measure the partially blocked areas from the uniform light source. When the display of the present invention is divided into separate areas, each area has its own independent illumination differing spatially from adjacent illuminations due to the plurality of light signals emitted. As a result, all of the signals can be detected simultaneously and be quickly summed together to provide the desired information.

A target could also be detected by the composition of its surface. The absorptive characteristics of the surface can absorb and/or reflect light signals differently based on the wavelength of the signals. Emitting light signals of different wavelengths, which might be accomplished by fabricating VCSEL structure 2 with different elements, could, therefore, also indicate the absorptive characteristics of the material. In either situation, detecting a target based on its characteristics, or detecting the characteristics of a target, a microprocessor could determine characteristics by comparing the light signals received by a detector with the signals emitted by a VCSEL structure. If the difference in wavelength among the signals emitted were large enough to detect by a detector, a plurality of detectors (such as detector 32 depicted in the figures) could be used to detect signals within different ranges of wavelength, which might provide more detailed information about the absorptive characteristics of most targets. Features can be compared to characteristics stored in memory.

In order to detect targets of various sizes, optics could be added. A lens or array of lenses can be positioned between VCSEL structure 2 and target 30 such that the lens reproduces the pattern of emitted light signals into a larger or smaller pattern in the image plane. The emission pattern of the image would be identical in shape to the original pattern emitted but different in size. A microprocessor could then correlate the pattern of light signals received by detector 32 in the presence of target 30 with the pattern of signals originally emitted and/or with signals stored in memory.

Figure 6:
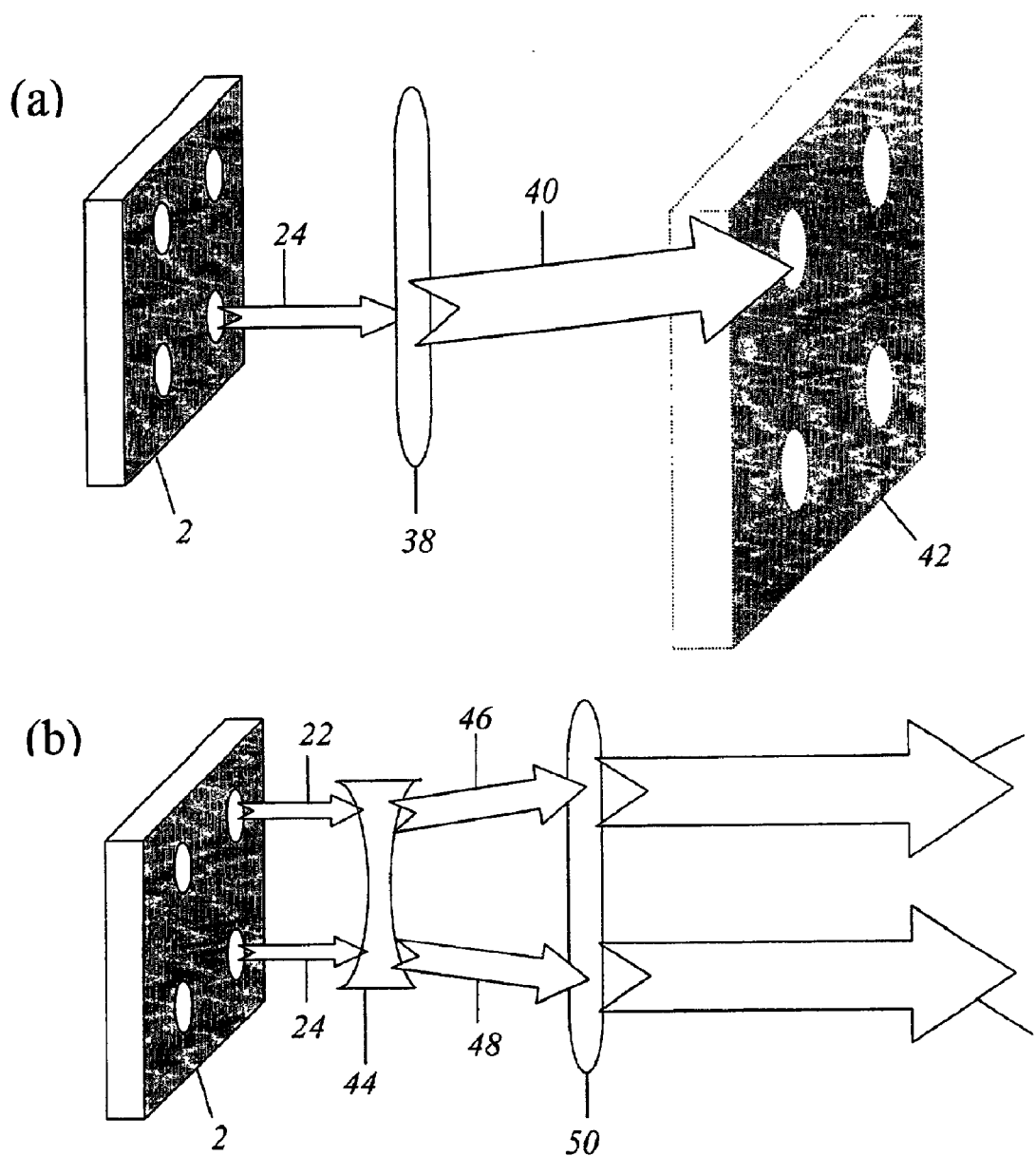
FIG. 6 illustrates diagrams of emitted light signals passing through 6(a) a single lens producing a magnified image of the emitted array and 6(b) a compound lens system producing an expanded version of the emitted array.

FIG. 6 illustrates two ways in which lenses can be used to alter the size of an array of light signals. In FIG. 6(a), a single lens 38 produces a magnified image 42 of the array emitted by VCSEL structure 2, affording detection of targets larger than the physical array. As light signal 24 enters lens 38, lens 38 magnifies signal 24 into a new light signal 40 having a larger diameter. In this particular configuration, magnified image 42 would be inverted compared to the array originally emitted by VCSEL structure 2. Two lenses could also be used in a collimator-telescope configuration (not shown). In FIG. 6(b) a compound lens system produces an expanded version of the array emitted by VCSEL structure 2. As light signals 22 and 24 enter lens 44, lens 44 manipulates (either through convergence or divergence) signals 22 and 24, creating new light signals 46 and 48, respectively. Signals 46 and 48 then enter a lens 50, which collimates signals 46 and 48 into new signals 52 and 54, respectively. These resulting signals 52 and 54 have a larger diameter than light signals 22 and 24 originally emitted.

Figure 7:
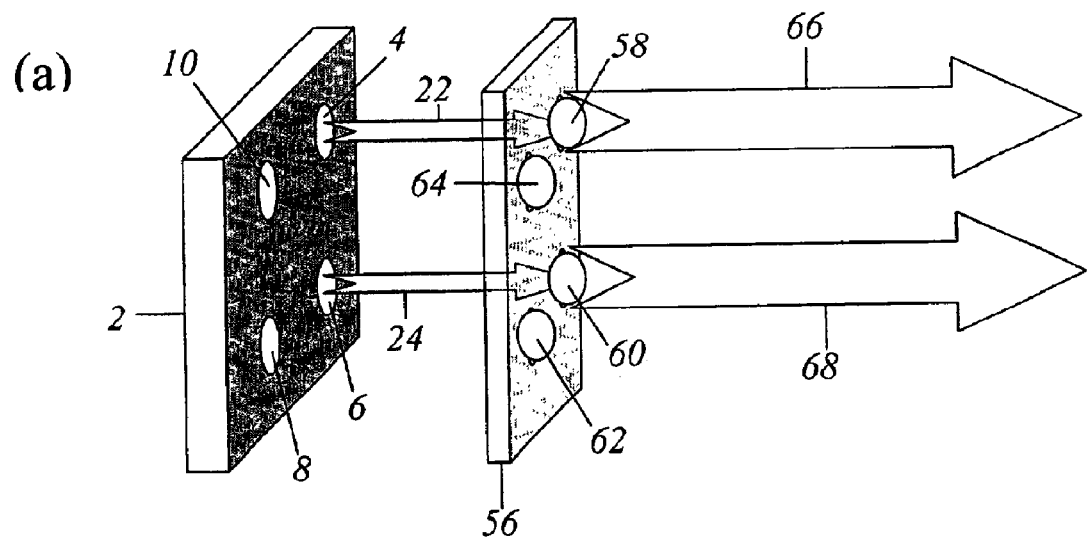
FIG. 7 illustrates diagrams of emitted light signals passing through arrays of lenses. The array of lenses in 7(a) expands the diameter of light signals without changing their center spacing. The array of lenses in 7(b) expands the diameter and changes the direction of emitted light signals.
Figure 7:
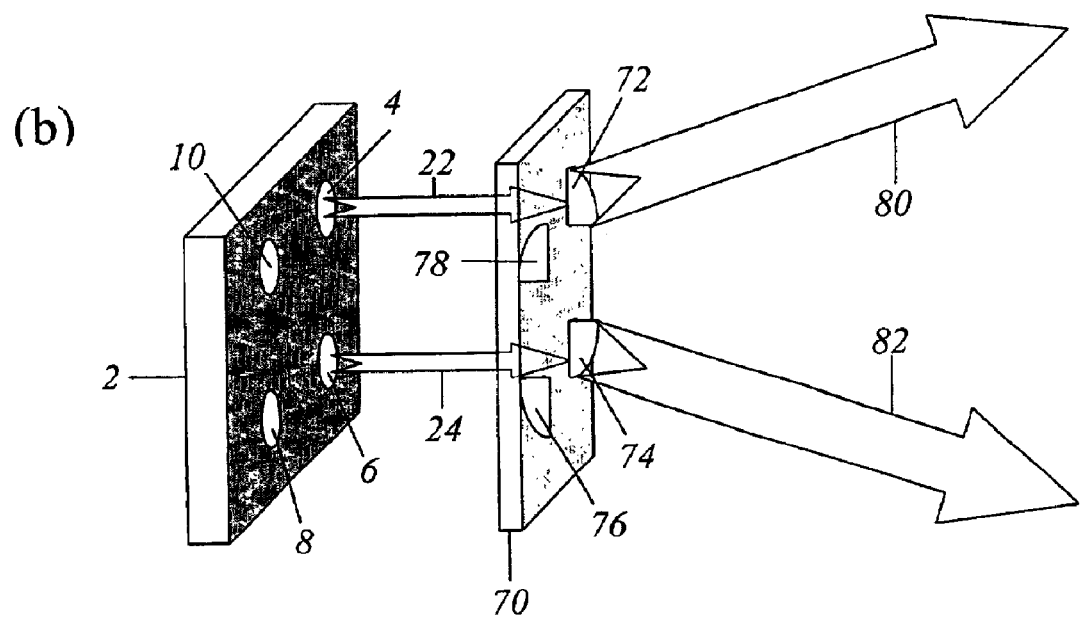

FIG. 7 illustrates alternative configurations of arrays of lenses that can be used to alter the array of light signals emitted by VCSEL structure 2. In FIG. 7(a) lens array 56 contains lenses 58, 60, 62, and 64 that correspond spatially to emission apertures 4, 6, 8, and 10, respectively. Lens 58 expands the diameter of entering light signal 22 into new light signal 66. Similarly, lens 60 expands the diameter of signal 24 into new signal 68. While the lenses of lens array 56 alter the size of the light signals, they do not alter the center spacing of the signals and thus conserve the spatial characteristics of the array emitted by VCSEL structure 2.

In FIG. 7(b) lens array 70 contains lenses 72, 74, 76, and 78 that correspond spatially to emission apertures 4, 6, 8, and 10, respectively. Lens 72 expands the diameter and changes the direction of entering light signal 22 into new light signal 80. Similarly, lens 74 expands the diameter and changes the direction of signal 24 into new signal 82. In this particular example, lens array 70 diverges entering light signals, though other configurations of divergence or convergence could be used as well.

Figure 8:
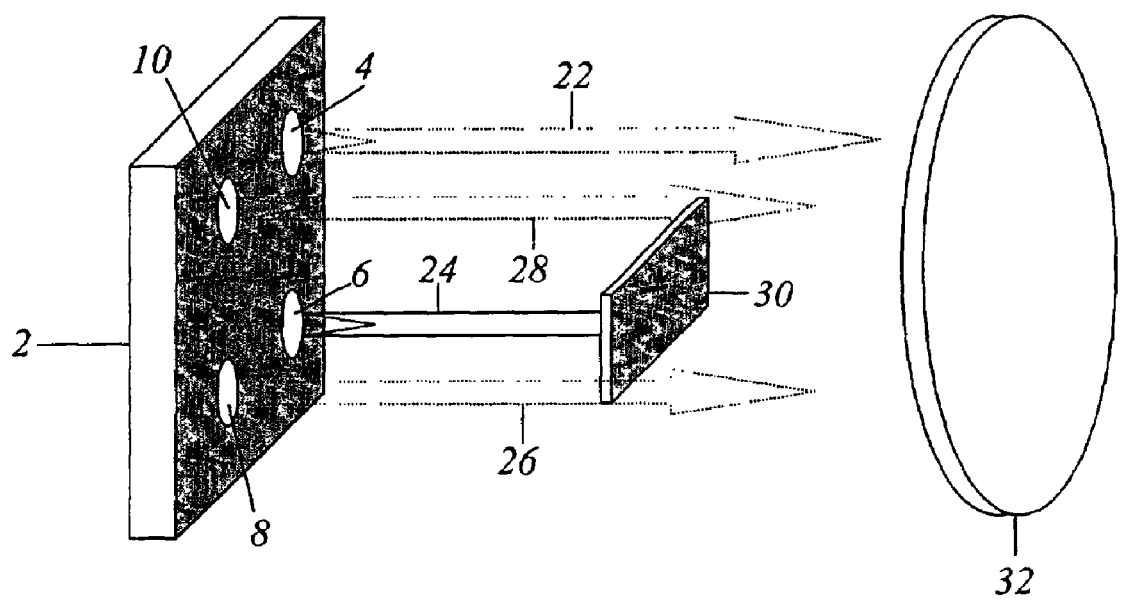
FIG. 8 illustrates a diagram of a target blocking a light signal serially emitted from a vertical cavity surface emitting laser structure before it reaches a detector.

In the second preferred embodiment, the timing of illuminating the individual elements is an integral part of the sensing process. The elements are serially illuminated in a sequence whose temporal characteristics are interpreted. In FIG. 8, VCSEL structure 2 is shown sequentially emitting light signals from emission apertures 4, 6, 8, and 10 in the order 4, 6, 8, 10, 4, 6, 8, 10, etc. Corresponding light signals 22, 24, 26, and 28 are, therefore, emitted from the emission apertures. In this example, three light signals have already been emitted (26, 28, 22), illustrated by the dotted lines, and one is currently lit (24). Light signal 26 has been emitted and has reached detector 32 unobstructed by target 30. Signal 28 was then emitted and similarly reached detector 32 obstructed. Light signal 22 reached target 30 next, also unobstructed. Currently, signal 24 is lit and has been blocked by target 30 before reaching detector 32. If the output of a single detector 32 disposed to receive all of the light signals in the array is monitored over time, the angular (and to a partial extent, the spatial) location of target 30 can be determined by the absence of a signal at the time the particular signal(s) are blocked. The array need not be circular, as linear arrays or multiple concentric rings could be used to map the shape of target 30 by interpreting the time-sequence of the output of detector 32.

Figure 9:
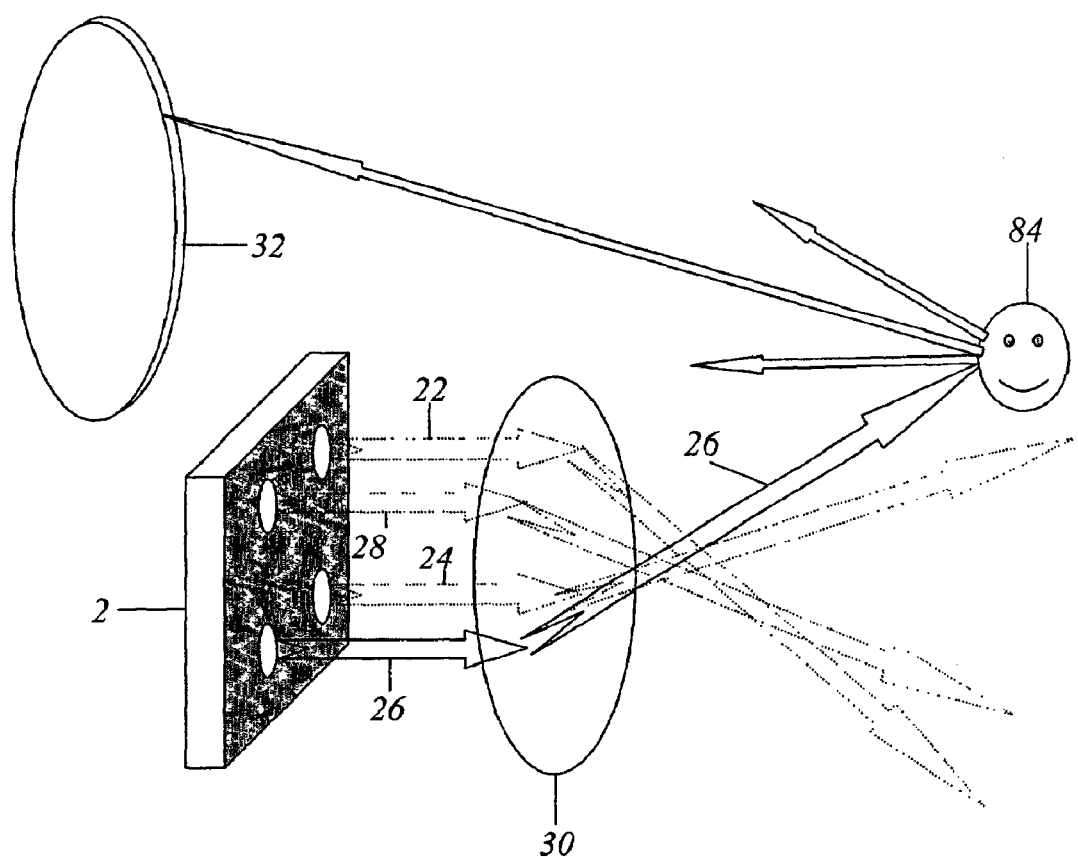
FIG. 9 illustrates how a lens can be used to spread light signals emitted by a vertical cavity surface emitting laser structure into an environment occupied by a target, wherein an emitted signal reflects off of the target and reaches the detector.

If optics are added, as depicted in FIG. 9, light signals can be steered into different angles. Light signals are shown passing through lens 30, positioned between VCSEL structure 2 and target 84. Lens 30 then redirects the light signals to different places in the environment, allowing a single detector 32 to sense targets 84 at widely separated locations. With only ten VCSEL elements, approximately, a full half-plane of 2π steradians could be monitored.

In this example, light signals 28, 22, and then 24 have already been sequentially emitted, as denoted by the dotted lines, and light signal 26 is currently lit. After being redirected by lens 30, light signal 26 travels until it intercepts target 84. Light signal 26 then reflects off of target 84 and reaches detector 32. It should be noted that target 84 happened to be positioned in the environment such that it lay in the path of light signal 26, rather than light signal 26 specifically seeking target 84. If target 84 were moved, it would lie in the path of a different light signal.

With linear arrays, position of a target along an axis can be detected. One example of a "circular" array application could use a single lens above VOSEL structure 2. This lens could skew each signal into a different angle as the individual elements are sequentially illuminated. A light signal can, therefore, be directed to different areas in an environment at different times by simply illuminating different elements at different times. Measuring the temporal output of a detector disposed to collect reflected light signals can provide information on the presence of a target and of its location. Even if location information is not necessary, the effective scanning of a light signal without moving parts can provide for a purely electrical function rather than a mechanical function. This feature allows for operation at a much lower input power, which could be important in battery-powered applications where energy conservation is often critical.

A lens or array of lenses can be positioned near VCSEL structure 2 such that a lens collimates each light signal passing through. Whereas current optical systems are generally known to collimate a single light signal into one parallel group of signals, the present invention can collimate each of a plurality of signals into corresponding parallel groups. Since each light signal passes through a lens at a different angle, due to the different location of each emission aperture on VCSEL structure 2, each group of collimated signals exits a lens at a different angle.

Using optics to spread a plurality of light signals to different areas in an environment to create a "room scanner" or "area scanner" could be used in a number of applications. In a possible security application, the sensing system could be used to detect the presence or absence of a person, which could in turn sound an alarm. Other information about the person could also potentially be determined, such as the size and shape of the person, the location within the room, and the direction and speed of movement in the room, and the information used to cause a controller to respond with action (e.g., alarm, lights on).

Figure 10:
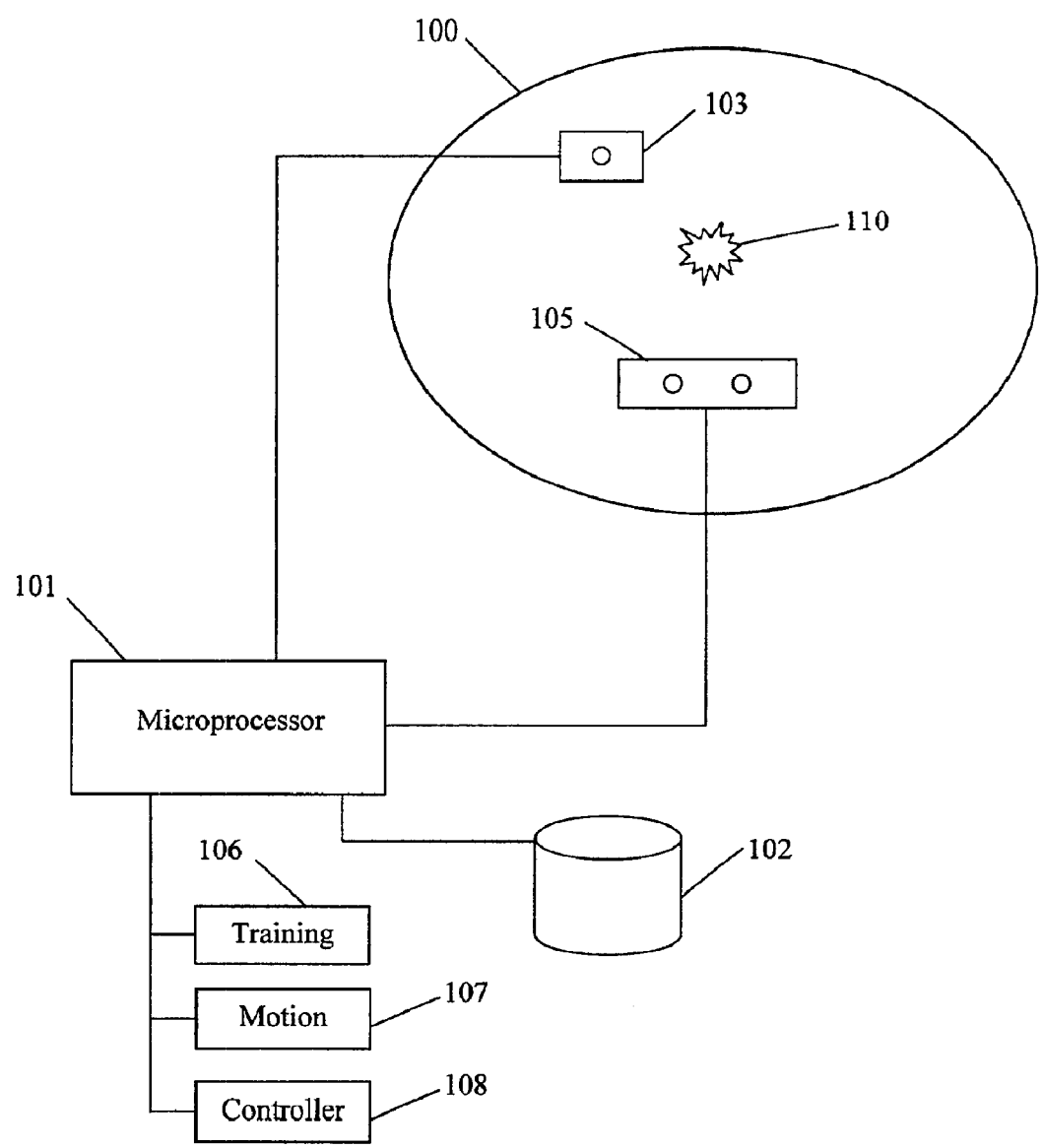
FIG. 10 illustrates a system for the present invention.

Referring to FIG. 10, target information could be determined by placing a single detector 103 in the room 100, positioned near to or far from laser structure 105, though a plurality of detectors could be used as well. A lens or array of lenses (not shown) could also be placed near detector 103 to effectively expand the area from which it can receive light signals. As the detector(s) 103 receives light signals reflected off of the target 110 and/or the walls or other objects in the room 100, a microprocessor 101 processes the signals to provide the desired information regarding the target 110. A control module 108 can trigger an action in response to the presence of a target or object in the environment. Action may be selectively triggered only when a target or object matching desired characteristics stored in memory 102 are present. A training module 107 may allow the system to be trained or calibrated with characteristics representative of targets or objects for which a triggered response is provided.

An 'area scanner' could be used in a number of device control applications. Devices may include area or room alarms, room lighting, appliance control, automatic doors, etc.) In a possible security application, the sensing system could be used to detect the presence or absence of a person, which could in turn sound an alarm. Other information about the person could also potentially be determined, such as the size and shape of the person (thereby eliminating certain targets, such as pets, from an response, such as turning on a light), the location within the room, and the direction and speed of movement in the room. All of such information could be determined by placing a single detector in the room, positioned near to or far from VCSEL structure, though a plurality of detectors could be used as well. A lens or array of lenses could also be placed near detector to effectively expand the area from which it can receive light signals. As the detector(s) receive(s) light signals reflected off of the target and/or the walls or other objects in the room, the microprocessor processes the signals to provide a desired result (e.g., turn on lights, HVAC).

If a plurality of detectors were used, the processing time devoted to each could be divided to optimize the type of information desired. For instance, one detector might detect solely the presence or absence of a target, while two other detectors detect differences in the wavelength of light signals received. The microprocessor could devote all of the computing power to detecting a target until a target is detected. Once detected, the microprocessor could devote the power to determining the absorptive characteristics of the target's surface. Similarly, if each emission aperture comprised a separate array of apertures, an array of arrays could be used to provide both low and high levels of information. Once a detector detects a specific array of light signals, the microprocessor could focus on processing the array of light signals within that particular array to provide more detailed information.

Another application might involve a lighting control system, where the presence or absence of a target or person determines the operating status of lights in a room. Unlike lighting systems activated by simple motion sensors, the present invention enables the design of much more complex systems which could use the specific characteristics of a target's makeup or motion to control specific lighting patterns. For instance, a user could specify a particular group of lights in a room to turn on if a person enters the room, but not to turn on if a robotic device enters. Applications could also include the control of a robot itself, or any robotic or automated process involving object recognition, motion detection, or other types of sensing.

Referring again to FIG. 10, a system may include a vertical cavity surface emitting laser structure 105 with at least two emission apertures that could be defined by known processing methods such as photolithography. A laser signal may be emitted into an environment 100 from each of the emission apertures. The system may also include at least one detector 103 that is operationally responsive to the vertical cavity surface emitting laser structure 105. The system may include a microprocessor 101 that is operationally coupled to the detector(s) 103, VCSEL 105 and a memory 102, such as a database, for storing target data and a training module for allowing the system to be trained to recognize targets 110. The trainable laser optical sensing system may make positive identification of object once trained where microprocessor 101 references a database 102 and/or using neural network capabilities to correlate the detected pattern of light signals from the target 110 with stored patterns of signals from known targets. The trainable laser optical sensing system may also includes a training module 106. The training module would include software used by the microprocessor 101 during training and detection operations. A motion analysis module 107 may also be included to enable the system to determine target mobility characteristics (e.g., velocity, direction).

Figure 11:
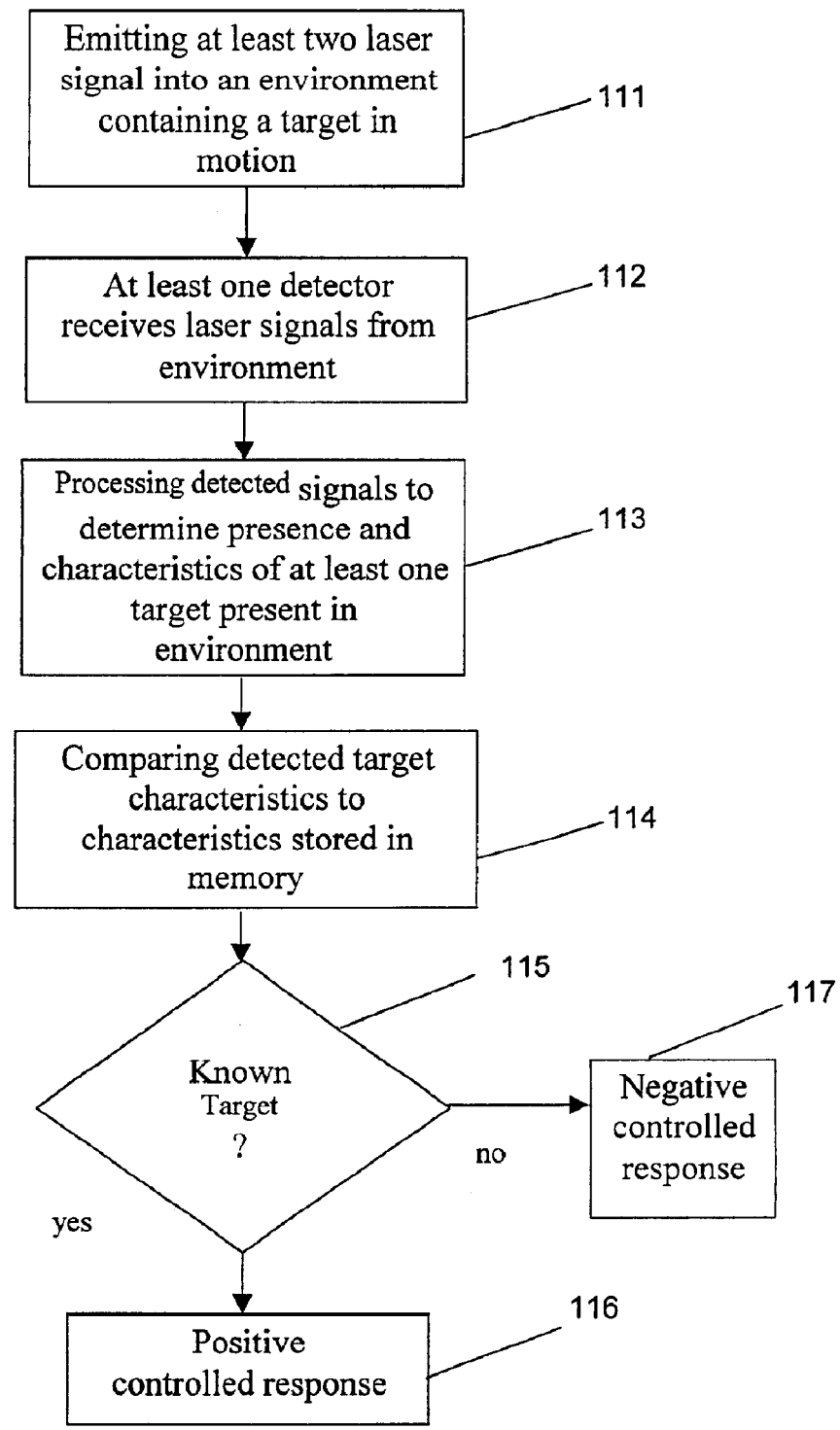
FIG. 11 illustrates a flow chart of a method for the present invention.

Referring to FIG. 11 a flow chart for a method for detecting the presence of an object in a monitored area using an object detection system and selectively causing a response when an object is detected is described. During system operation, vertical cavity surface emitting laser structure may emit at least two laser signals into the environment 111, which may be occupied by at least one target. The system receives laser signals 112 with at least one detector. The system determines the presence or absence of known objects 113 in said environment using a microprocessor. Presence is generally determined where an object is present and wherein at least one of said laser signals is blocked by at least one object. Characteristics of said object are determined by comparing 114 laser signals associated with said object received by said detector with object characteristics stored in a memory. The system makes a determination regarding a control function 115 based on the familiarity of the target to the system or target authorization. If a known, or authorized target or object is present in the environment, the system may selectively causing a controller response in accordance with the determination of object characteristics and/or correlating response criteria. For example, if the object is known to the system, the system may turn on lights in a room 116 and/or may not trigger a security alarm. If the target is not known to the system, the system may not turn on lights and/or may trigger a security alarm 117.

The system may be trained by emitting at least one laser signal at a time into an environment containing a known target, or known target characteristics, using a vertical cavity surface emitting laser structure. The known target may be referred to as a test target. The test target interferes with laser signals. Signal reflected off of said test target are received by at least one detector. The laser signals, representing target characteristics, are stored in memory.

An application using a one-dimensional array might involve detecting the angle or position in space of a target. Cycling through various patterns of signal emission and comparing the light signals emitted with the signals received might indicate these variables. With the inherently rapid nature of signal emission from VCSEL structures, a microprocessor could determine and provide this information on a real-time basis, which would be important if the angle or position of the target constantly changes.

It should be noted that nearly all of the aforementioned applications, as well as any others, could potentially be addressed using either transmissive or reflective systems. The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. An area scanning system, comprising:
   a laser source with at least two emission apertures, wherein said laser source is adapted by said emission apertures to emit at least two laser signals into an environment occupied by a target wherein the at least two laser signals can be reflected or absorbed by objects located in said environment and said environment;
   at least one photodetector adapted to receive reflected laser signals from objects located in said environment and said environment;
   a microprocessor operationally coupled to said at least one photodetector and having access to a database, wherein said microprocessor is programmed to determine target characteristics based on comparison of reflected laser signals received by said detector from said environment and any object located therein to target characteristics obtained from the database; and
   a control module associated with and under the control of said microprocessor, said control module for triggering a response at the direction of said microprocessor, wherein the response is based onto the presence of at least one object located in said environment that can be identified by said microprocessor;
   wherein said microprocessor analyzes laser signals received by said detector to determine the presence of objects identified by said system and located within said environment.

2. The system of claim 1 further comprising a memory for further providing said system with a target-free environment and/or known target characteristic data.

3. The system of claim 2 wherein object characteristics are determined by said system based on comparison of laser signals received by said detector after interference with objects newly introduced into said environment with said target characteristics stored in said database.

4. The system of claim 1, wherein said laser is a vertical cavity surface emitting laser.

5. The system of claim 1 further comprising a database storing reference characteristics associated with known objects, said reference chracteristics being accessible by said microprocessor from said database.

6. The system of claim 5 wherein said laser source emits at least two laser signals through at least two apertures associated with said laser source into an environment occupied by at least one object, said at least one photodetector detects said at least two laser signals after said signals pass through said environment containing at least one object, and said microprocessor determines characteristics associated with said at least one object based on comparison of said signals received by said photodetector with said object characteristics stored in said database.

7. The system of claim 5, wherein said laser is a vertical cavity surface emitting laser.

8. A method for detecting the presence of an object in a monitored area using an object detection system and selectively causing a response when an object is detected, comprising the steps of:
   emitting at least two laser signals into a monitored area using a vertical cavity surface emitting laser structure;
   receiving laser signals reflected and not blocked by said environment and at least one object target using at least one photodetector;
   determining the presence or absence of at least one object in said environment using a microprocessor, wherein an object is present when at least one of said laser signals is blocked by at least one object;
   using said microprocessor for determining characteristics of said at least one object by comparing laser signals received by said photodetector and associated with said at least one object with known object characteristics stored in a memory; and
   using said microprocessor for selectively causing a controller response following said determination of object characteristics by said microprocessor.

9. The method of claim 8 further comprising training an object detection system to determine object characteristics through the steps of:
   emitting at least one laser signal at a time into an environment using a vertical cavity surface emitting laser structure;
   utilizing at least one photodetector for receiving laser signals reflected and not blocked by said test object and said environment, said laser signals representing object characteristics associated with said test object; and
   storing said object characteristics in memory.

10. The method of claim 8, wherein said microprocessor determines the size or shape of said object by analyzing laser signals received by said photodetector alter different arrays of laser signals are emitted by said vertical cavity surface emitting laser structure into said environment and are subsequently compared with object characteristics stored in memory.

11. A method for scanning a monitored area and detecting the presence of predefined targets comprising the steps of:
   providing a laser-based object detection system including a laser source for emitting at least two laser signals into an environment, at least one photodetector for receiving laser signals reflected off of targets in said test environment, and a microprocessor having access to data stored in memory and representing characteristics of known targets stored in the memory in the form of data associated with unique signature of reflected laser signals;
   monitoring an environment, said environment having characteristics known by said laser-based object detection system to be associated with an object-free environment by emitting at least two laser signals into said environment wherein at least one of said at least two laser signals is blocked by at least one object, said at least one object interfering with said at least one laser signal;
   detecting the presence of said at least one object in said environment by receiving said at least one laser signal being blocked by said at least one object through said at least one photodetector; and determining with said microprocessor the identification of said at least one object in said environment by comparing said characteristics of known targets with said at least one signal received from said environment by said at least one photodetector.

12. The method of claim 11, wherein the size, shape and/or motion of said object is determined by analyzing laser signals received by said photodetector after different sequences of laser signals are emitted by said laser source.

13. The method of claim 11, wherein angular or spatial location of said at least one object are determined by comparing over time sequences of laser signals emitted by said laser source with corresponding sequences of laser signals received by said photodetector.

14. The method of claim 11, wherein the presence or absence of an object is determined by comparing sequences of laser signals emitted by said laser source with laser signals received by said photodetector.

15. The method of claim 11 wherein a control function associated with the detection and identification of said at least one object is executed.

16. The method of claim 15 wherein said control function is to turn at least one light within said environment.

17. The method of claim 15 wherein said control function is to activate an alarm if said at least one object is not identified.

18. The method of claim 15 wherein said control function is to activate a HVAC system associated with said environment.

* * * * *